United States Patent [19]
Sawyer

[11] 3,859,845
[45] Jan. 14, 1975

[54] LEAK DETECTOR
[75] Inventor: James T. Sawyer, Huntsville, Ala.
[73] Assignee: The United States of America as represented by the Administrator of the National Aeronautics and Space Administration, Washington, D.C.
[22] Filed: Mar. 5, 1973
[21] Appl. No.: 337,816

[52] U.S. Cl..................... 73/49.2, 73/40, 200/83 N
[51] Int. Cl............................................ G01m 3/26
[58] Field of Search............. 73/40, 46, 49.2, 146.5; 340/242; 200/83 A, 83 N

[56] References Cited
UNITED STATES PATENTS
| 2,111,168 | 3/1938 | Chansor | 200/83 N |
| 2,749,536 | 6/1956 | Sperling | 340/242 |
| 2,801,409 | 7/1957 | Sperling | 340/242 |

FOREIGN PATENTS OR APPLICATIONS
| 1,204,791 | 8/1959 | France | 73/40 |

Primary Examiner—Richard C. Queisser
Assistant Examiner—Joseph W. Roskos
Attorney, Agent, or Firm—Wayland H. Riggins; L. D. Wofford, Jr.; John R. Manning

[57] ABSTRACT

A detector for sensing a leaking of fluid pressures. The detector is characterized by an hermetically sealed housing confining therewithin a first or normalized pressure, a connector for coupling the housing in direct communication with a suspected leak established within a substantially sealed body, an electrical circuit having a first or normalized configuration and including a pair of circuit-completing electrical contacts and means mounting at least one contact of said pair of contacts on a flexible wall of the housing supporting the contact for movement from a first position along a linear path to a second position in response to an altering of the pressure confined within the housing for thereby altering the configuration of the circuit.

3 Claims, 6 Drawing Figures

PATENTED JAN 14 1975 3,859,845
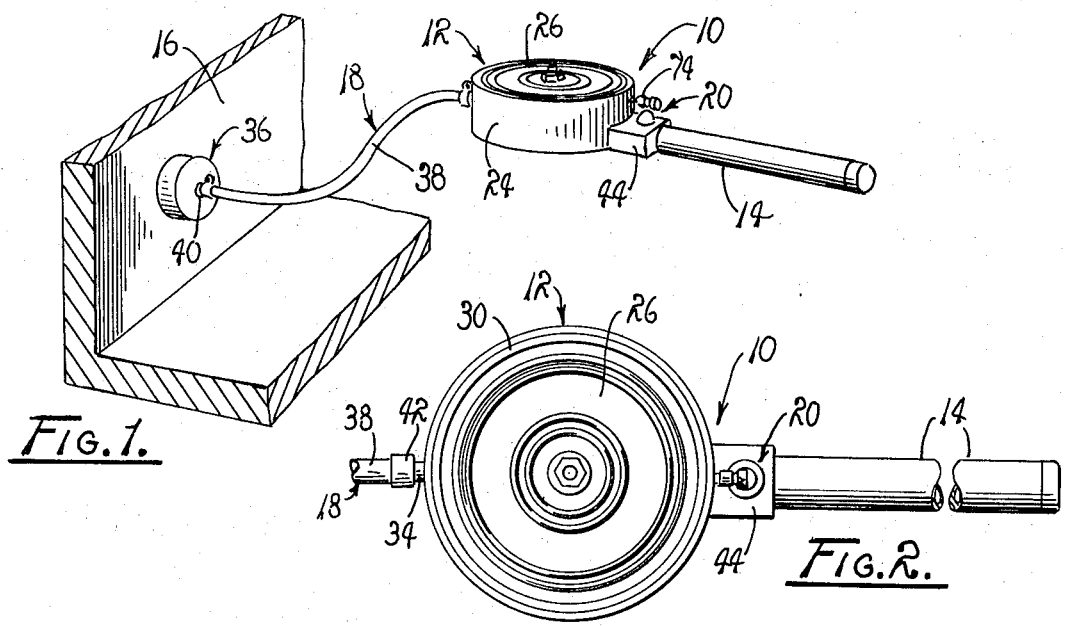
FIG. 1.
FIG. 2.
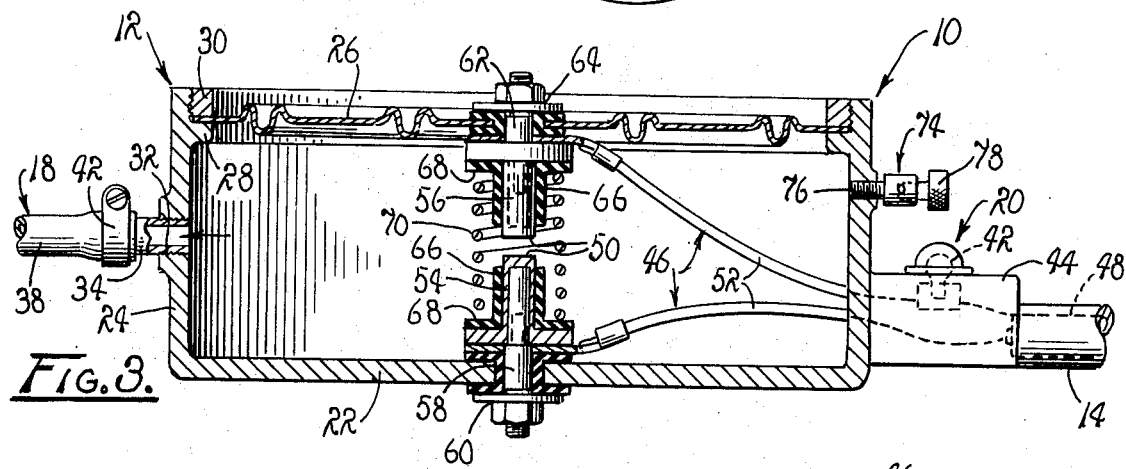
FIG. 3.
FIG. 4.
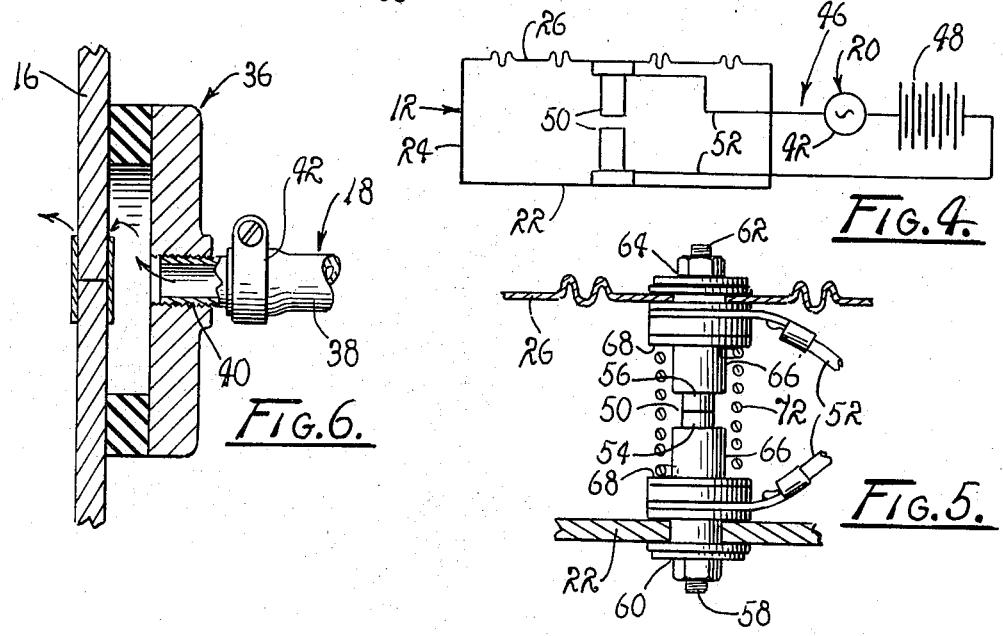
FIG. 6.
FIG. 5.

LEAK DETECTOR

ORIGIN OF INVENTION

The invention described herein was made by an employee of the United States Government and may be manufactured and used by or for the Government for governmental purposes without the payment of any royalties thereon or therefor.

BACKGROUND OF THE INVENTION

The invention relates generally to portable devices for sensing leaks of pneumatic pressure from substantially sealed housings, and more specifically to a portable device particularly adapted to be employed aboard operative spacecraft in detecting leaks of positive cabin pressure to the negative pressure of a celestial space environment.

The prior art includes numerous devices adapted to be employed in detecting changes in confined pressures. Among such devices are those typified by the patent to Sperling U.S. Pat. No. 2,749,536 which includes a probe coupled with a chamber and a pressure-actuated arm. The arm is supported for rotation in directions determined by the nature of the pressure delivered through the probe for completing the signal circuit.

It is, however, to be understood that existing devices do not completely satisfy existing needs. As is well understood, the weightlessness of a celestial space environment necessitates the use of devices which have a high degree of reliability, without regard to gravity-imposed restrictions, and yet be sufficiently economical to accommodate an abandonment thereof. Furthermore, devices employed in space probes of a substantial duration must be simple and function efficiently even in a hostile environment.

It is therefore the general purpose of the instant invention to provide an improved, portable detector capable of sensing leaks of pressure as they occur aboard manned spacecraft operating in a celestial space environment.

OBJECTS AND SUMMARY OF THE INVENTION

It is therefore an object of the instant invention to provide an improved leak detector.

It is another object to provide a detector which provides a practical solution for overcoming the aforementioned difficulties and disadvantages.

It is another object to provide an improved detector for sensing leaks from substantially sealed bodies confining pneumatic fluid at normalized pressures.

It is another object to provide a portable manually operable detector for detecting minute leaks of artificial atmosphere from manned spacecraft operating in a celestial space environment.

It is another object to provide a detector which is simple, economical, and practical for use in detecting leaks of positive cabin pressures from spacecraft operating in the vacuum of space.

These and other objects and advantages are achieved through the use of a housing having a flexible wall and confining fluid at a normalized pressure, means for altering the pressure within the housing including a connector adapted to couple the housing in direct communication with an opening formed within a selected substantially sealed body having a flow of fluid established therethrough, an electrical circuit having a normal configuration, including a pair of electrical contacts, one of which is supported by the flexible wall of the housing to be displaced in response to changes in pressure within the housing for altering the configuration of the electrical circuit, as will hereinafter become more readily apparent by reference to the following description and claims in light of the accompanying drawings.

BRIEF DESCRIPTION OF THE DRAWINGS

FIG. 1 is a perspective view depicting a use of a device which embodies the principles of the instant invention in detecting a leak of pressure.

FIG. 2 is a fragmented top plan view of the device shown in FIG. 1.

FIG. 3 is a cross-section side view, illustrating a normalized configuration for an electrical circuit provided for the device.

FIG. 4 is a schematic diagram of the electrical circuit.

FIG. 5 is a fragmented view of the device depicting a normalized configuration of a circuit provided in a modified form of the device.

FIG. 6 is a cross-sectional view of a connector provided for coupling the device with an opening defining a leak through which pressure is exchanged.

DESCRIPTION OF THE PREFERRED EMBODIMENT

Referring now to the drawings wherein like reference characters designate like or corresponding parts throughout the several views, there is shown in FIG. 1 a detector 10 which embodies the principles of the instant invention.

The detector 10 has particular utility as a portable, manually operable device and is particularly suited for use in detecting leaks of a positive cabin pressure aboard an operative spacecraft to the negative pressure or vacuum of a celestial space environment. However, it should readily be apparent that the device 10 has utility independent of a celestial space environment and may be employed in any environment wherein a loss of pressure exchange occurs.

As shown in FIG. 1, the detector 10 includes an hermetically sealed housing, generally designated 12, supported by a suitable handle 14. The housing is adapted to be coupled with a pressure leak formed within a bulkhead 16 through a tubular connector, generally designated 18. Adjacent the base of the handle 14 there is provided a visual indicator, generally designated 20, which provides visually detectable signals indicative of the existence of a detected leak of pressure through the bulkhead 16.

As depicted in FIG. 3, the housing 12 is defined by a rigid bottom wall 22, a rigid sidewall 24, of an annular configuration, and a flexible top wall 26. The particular material from which the housing 12 is fabricated is a matter of choice, dictated by the nature of intended use of the detector 10. As a practical matter, a suitable synthetic resin serves quite satisfactorily for this purpose. Therefore, it should be apparent that the techniques employed in fabricating the housing are consistent with those techniques commonly employed in fabricating similar bodies from various types of synthetic resins. It is important, however, to understand that the housing 12 is hermetically sealed with respect to its ambient environment.

As shown in the drawings, the top wall 26 preferably is of an annularly corrugated configuration which enhances its resiliency. This wall is seated on an annular lip 28 provided about the upper portion of the internal surface of the sidewall 24. A suitable lock-ring 30 is employed as a retainer for securing the top wall 26 in place. In practice, the lock-ring 30 is mated with the sidewall 24 in any suitable manner, including a use of screw threads, not designated.

The side wall 24 further includes a port 32. Through this port pneumatic fluid under pressure is exchanged with the internal portions of the housing 12. Within the port 32 there is seated a nipple 34 which is coupled with the sidewall 24 through any suitable means, including a use of screw threads, also not designated.

The nipple 34, in practice, functions as a coupling for joining the connector 18 with the housing 12 of the detector 10. As shown in the drawings, the connector 18 is provided with a head 36 united with the nipple 34 through an interconnecting length of flexible tubing 38. It is, of course, to be understood that where desired the length of tubing 38 can be foreshortened, or even deleted. For the sake of versatility, however, the tubing 38 is of a practical length so that an operator may grasp the handle 14 in one hand while manipulating the head 36 with the other. Preferably, the head 36 also is provided with an extended nipple 40, FIG. 6, while commercially available banding clamps 42 are provided for coupling the tubing 38 with the nipples 34 and 40.

While various types of indicators, including audible devices, may be employed, as illustrated, the indicator 20 includes a color coded lamp 42 affixed to the upper surface of a housing 44 supported by the sidewall 24 of the housing 12. As shown, the lamp 42 is coupled within an electrical circuit, generally indicated 46, FIG. 4, which also includes a source of electrical potential 48 and a pair of contact points 50 coupled together through a plurality of electrical leads 52.

As also illustrated in FIG. 4, the contact points 50 are in circuit series with the source of potential 48 and the lamp 42 so that upon closing the contact points 50 an electrical circuit is completed through the lamp 42, whereupon the lamp is illuminated in a manner well understood by those familiar with such devices. The pair of contact points 50, in practice, are defined by the distal ends of a pair of caps 54 and 56 fabricated from an electrically conductive material. The cap 54 is supported by a center post 58 which has a base of nonconductive material, so that it is insulated from the cap, and extends through the bottom wall 22 of the housing 12. The center post, in turn, is securely connected with the bottom wall by any suitable means, including a nut and washer combination 60.

Similarly, the cap 56 is supported by a center post 62 extended through the top wall 26 of the housing 12. This post also is electrically insulated and is secured in place by suitable means, including a suitable nut and washer combination 64. Through the contact points 50 and the bodies of the caps 54 and 56 electrical continuity is established between adjacent ends of the leads 52 coupled therewith. About the caps 54 and 56 there is provided a pair of spring retainers, each being formed from a non-conductive material and having an annular shoulder 68 for receiving one end of a compression spring 70.

Therefore, it should readily be apparent that the compression spring 70 is insulated from and biases the caps 54 and 56 in opposite directions, so that the contacts 50 are biased into a mutually spaced relationship when the circuit 46 is in its normalized configuration.

It should, of course, be readily apparent that in the event the interior of the hermetically sealed housing 12 is evacuated, the flexible top wall 26 is flexed inwardly, whereupon the contact support cap 56 is advanced along a linear path toward the cap 54. This advancement is against the applied forces of the biasing spring 70. It can therefore be appreciated that the flexibility of the top wall 26 accommodates rectilinear motion of the cap 56, whereby the circuit 46 is reconfigured from a normalized, opened configuration to a closed circuit configuration in response to a reduction of pressures within the housing 12.

A modified form of the device is illustrated in FIG. 5. As shown in FIG. 5, the compression spring 70 is replaced by a tension spring 72 which acts to urge contacts 50 into continuous engagement, whereby the circuit 46 is closed when in a normalized configuration. When employing the tension spring 72, an increase in pressure within the housing 12 causes the cap 56 to advance in a linear direction away from the cap 54, whereupon the contacts 50 are disengaged for opening the circuit 46. Therefore, the housing 12 can readily be employed for detecting a leak at its output side or downstream end.

In some instances, it has been found particularly desirable to provide a valve 74 for determining the rate of a detected leak. Such a valve 74 is shown in FIG. 3. The valve 74 includes a valve stem 76 received in screw-threaded engagement with the annular sidewall 24 of the housing 12. At the distal end of the valve stem 76 there is provided a needle valve unit 78. As is well understood, needle valves include a valve seat and a tapered valve stem axially displaceable with respect to the seat for varying the rate of a flow of fluid therethrough. As shown, a knurled knob, not designated, is provided at the distal end of a valve stem and serves to reposition the stem relative to the seat as it is manipulated in accordance with known practices. The valve 74 is, in practice, calibrated so that the position of the valve stem is readily observable.

It should be appreciated that once a leak has been detected and the valve 74 opened a distance sufficiently to maintain the circuit in its normalized configuration, as pneumatic pressure is passed through the valve, the rate of flow of the leak can readily be determined due to a prior calibration of the valve.

OPERATION

It is believed that in view of the foregoing description, the operation of the device 10 will be readily understood and it will be briefly reviewed at this point.

With the detector 10 assembled in the manner hereinbefore described, it is prepared for use in detecting existing leaks of pneumatic pressure from a body, such as the cabin of a spacecraft. With the circuit 46 in its first or normalized configuration, the contacts 50 thereof are supported in a mutually spaced relationship. As a practical matter, the pressure within the housing 12 also is normalized. That is to say the pressure within the housing 12 is a first pressure equalized with ambient pressures. However, as the head 36 is positioned over the upstream end of a suspected leak, the interior of the housing 12 is evacuated through the tubing 38 and the head 36. Evacuation, of course, causes the pressure within the housing to drop. This drop or reduction in pressure within the housing 12 causes the wall 26 to flex inwardly for thereby forcing the cap 56 to advance along a linear path toward the fixed cap 54 against the applied forces of the compression spring 70. Such motion of the cap 56 causes the pair of contacts 50 to become engaged, whereupon the circuit 46 is reconfigured to a closed circuit. Closing of the circuit 46 causes the lamp 42 to become illuminated as electrical potential is applied thereacross from the source of potential 48.

In the event a tension spring 72, as illustrated in FIG. 5, is employed for maintaining the contacts 50 in an engaged relationship, for maintaining the circuit closed, the normalized configuration of the circuit is a closed circuit configuration. Consequently, when the head 36 is applied at the downstream end of the suspected leak, in a manner such that pressure is increased within the housing 12, the wall 26 is displaced outwardly, against the applied forces of the spring 72. This motion causes the contacts 50 to become disengaged, whereupon the circuit is reconfigured to an open circuit for thereby extinguishing the lamp 42.

The valve 74 is adjusted so that the normalized circuit configuration is barely maintained in the presence of the leak. Since the valve is a calibrated valve, the rate of the detected leak can be determined as the pressure is varied within the housing 12 at a rate such that the circuit is maintained on the verge of being reconfigured.

In view of the foregoing, it is to be understood that the detector 10 of the present invention provides a practical leak detector particularly suited for use aboard a spacecraft in verifying loss of cabin pressure and the like.

Although the invention has been herein shown and described in what is conceived to be the most practical and preferred embodiment, it is recognized that departures may be made therefrom within the scope of the invention, which is not to be limited to the illustrative details disclosed.

I claim:

1. An improved portable detector for sensing leaks of pneumatic fluid through a substantially sealed body comprising:
   a. an hermetically sealed housing confining a predetermined pneumatic pressure;
   b. said housing comprising a flexible wall and a rigid wall, said walls being opposite each other;
   c. means for altering the pressure within said housing including a connector adapted to couple the housing in direct communication with an opening formed within a selected, substantially sealed body having a flow of fluid established therethrough;
   d. an electrical circuit including a pair of electrical contacts located within said housing;
   e. said flexible wall supporting one contact of said pair of contacts for movement from a first position along a substantially linear path to a second position in response to an altering of the pneumatic pressure within said housing;
   f. said other of said pair of contacts being supported by said rigid wall;
   g. means for providing a visual indication of the position of said one contact;
   h. means including a needle valve in the wall of said housing for determining the rate at which said pressure is altered when a leak has been detected.

2. The invention as defined in claim 1 further including biasing means comprising a helical spring around said contacts urging said one contact toward said first position.

3. The invention as defined in claim 2 wherein said connector includes a flexible tube coupled to said housing and a resilient head affixed to the distal end of said tube adapted to be applied to said opening.

* * * * *